March 2, 1965 S. E. HOLBROOK ETAL 3,171,539
FILM FOR PACKAGING
Filed Jan. 30, 1959 2 Sheets-Sheet 1

INVENTORS
STANLEY E. HOLBROOK
DONALD J. d'ENTREMONT
BY Cushman, Darby & Cushman
ATTORNEYS

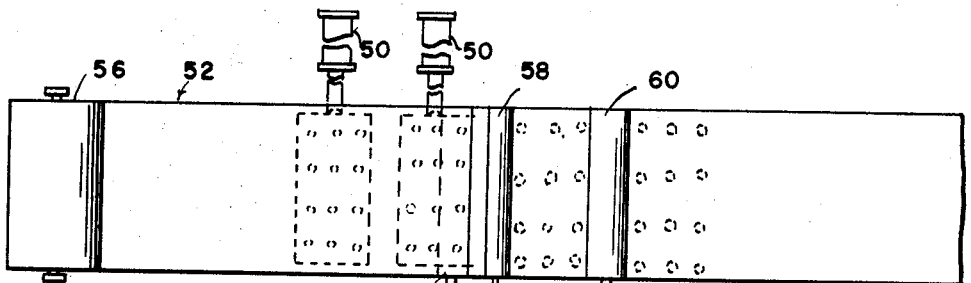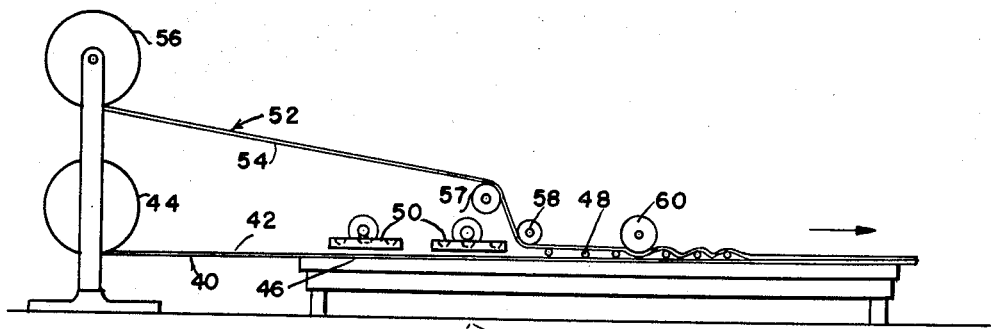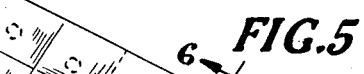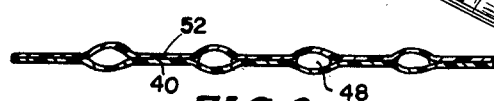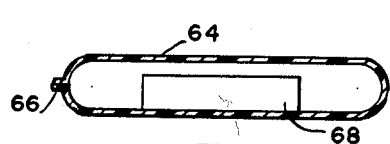

3,171,539
FILM FOR PACKAGING
Stanley E. Holbrook, South Acton, Mass., and Donald J. D'Entremont, Greenville, S.C., assignors to W. R. Grace & Co., Cambridge, Mass., a corporation of Connecticut
Filed Jan. 30, 1959, Ser. No. 790,177
9 Claims. (Cl. 206—46)

This invention relates to the treatment of irradiated polyethylene.

The use of corona or similar electrostatic type discharge has been proposed in order to increase the retentivity of regular, unirradiated polyethylene for printing inks.

It is also known in the art that regular polyethylene can be given increased ability to retain printing inks by treating it with a gas flame, aqua regia, chromic acid and other oxidizing media.

It is an object of the present invention to prepare irradiated polyethylene having improved adherence to itself.

Another object is to prepare irradiated polyethylene which will permanently bond to itself without the application of heat and/or pressure.

A further object is to prepare irradiated, biaxially oriented polyethylene of increased utility.

An additional object is to prepare packages from irradiated, biaxially oriented polyethylene utilizing novel sealing means.

A still further object is to devise an improved procedure for joining adjacent packages of irradiated polyethylene.

Yet another object is to form laminae of two layers of irradiated polyethylene film having printing on at least one of the inner surfaces.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by treating irradiated oriented polyethylene with a corona discharge, or similar electrostatic discharge. Surprisingly, the corona discharge treated irradiated polyethylene will permanently bond to itself upon brief contact without the use of heat or pressure or other conventional sealing procedures. It has been observed that the side of the irradiated polyethylene which has been given the corona discharge treatment has this property to a much greater extent than the other side of the film. It is unexpected that corona discharge would have this self-adhesive effect since if it were an electrostatic effect the deposition of electrons upon the surface of the irradiated polyethylene would tend to make it repellent to another like charged irradiated polyethylene film. Contrary to expectations, however, when an irradiated polyethylene film having a corona discharge treated surface is placed on top of a different irradiated polyethylene film which also has a corona discharge treated surface, the two treated surfaces adhere very strongly together without the use of heat, pressure or other sealing aids. It has also been observed that this phenomenon does not occur if in place of the corona discharge there is employed a propane gas flame unless special conditions are employed. Other oxidative procedures such as aqua regia and chromic acid, which are effective for bonding printing inks to regular polyethylene, are not effective in the instant process.

The self-adhesiveness is so great that the films will tear rather than delaminate. The irradiated polyethylene film can be uniaxially oriented but preferably is biaxially oriented. Unoriented irradiated polyethylene film does not have the self-adhesive property.

The irradiated biaxially oriented polyethylene film can be made self-adhesive upon one face or upon both sides of the film. The property of self-adhesiveness is a permanent one and in this respect also differs from the application of printing ink to regular polyethylene utilizing a gas flame since the ability of regular polyethylene to retain printing inks diminishes sharply with the passage of time.

The phenomenon is a surface one since if the treated surface layer is sliced off, the remaining portion of the irradiated film does not retain the self-adhesive property.

For a fuller understanding of the invention, reference will be made to the accompanying drawings in which like numerals refer to like parts and wherein:

FIGURE 3 is a top plan view of an apparatus for packaging articles with corona discharge treated, irradiated, biaxially oriented polyethylene film.

FIGURE 4 is a side elevation of the apparatus of FIGURE 3.

FIGURE 5 is a perspective view illustrating a plurality of packages formed according to the invention.

FIGURE 6 is a sectional view taken along the line 6—6 of FIGURE 5.

FIGURE 7 is a vertical section of a package according to the invention.

Figure 1:
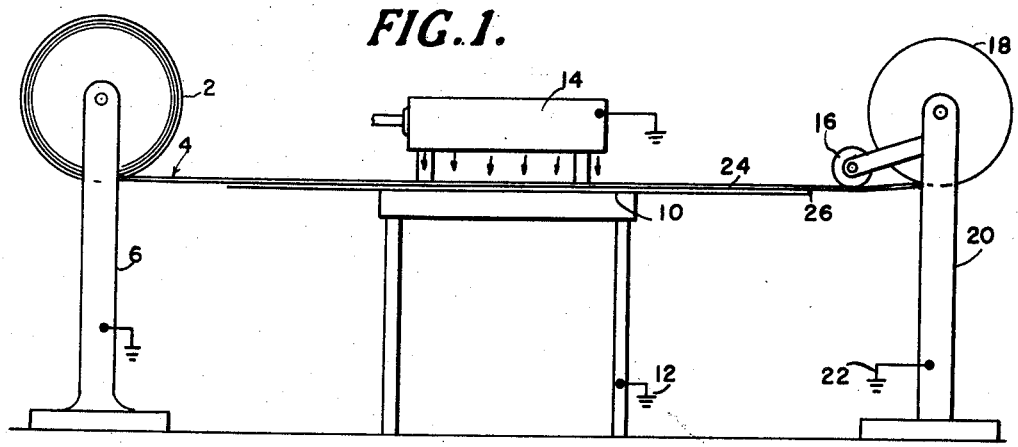
FIGURE 1 is a schematic illustration of a procedure for treating one side only of the irradiated polyethylene.

Referring more specifically to the drawings, there was provided a roll 2 of irradiated, biaxially oriented polyethylene film 4 (specifically Alathon 14, molecular weight of 20,000 and density of 0.916, which had been irradiated to an extent of about 12 megarad and then biaxially stretched 350% longitudinally and 350% laterally). The roll 2 was mounted for rotation on support 6. The irradiated polyethylene film was passed over metallic surface 10 which was appropriately grounded at 12. Above the metallic surface 10 and the film was positioned a corona type electrostatic discharge apparatus 14 (specifically there was employed a Howard electrostatic treater which is a 12,000 volt, single-ended, neon tube). After passing under the corona discharge apparatus, the film passed under metallic guide roller 16 and a rewind roll 18 upon support 20. It was observed that the upper surface 24 of the corona treated film had self-adhesive properties to such an extent that when there is a lamination of the upper surface to the upper surface of a similarly treated irradiated polyethylene film it could not be opened. These properties were present to a lesser extent on the lower surface 26 of the film. In fact, it was possible to wind the film on itself without the lower surface permanently adhering to the adjacent top surface. At a greater intensity of corona treatment, however, it was possible to make the lower surface permanently bond to the upper surface.

Figure 2:
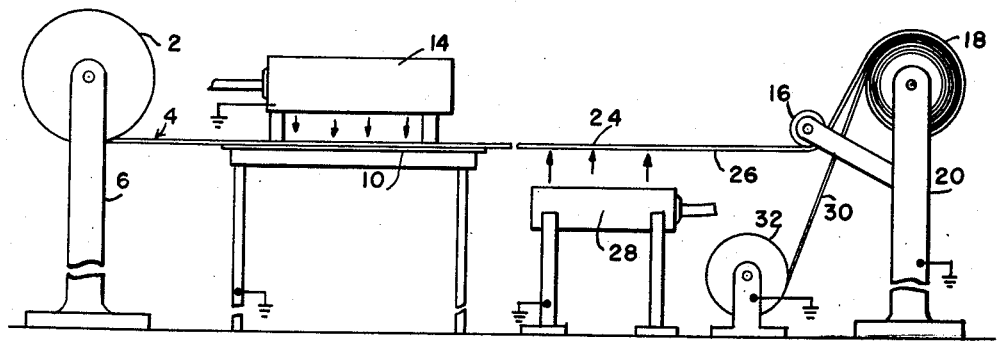
FIGURE 2 is a similar view illustrating the treatment of both sides of the irradiated polyethylene film with corona discharge.

FIGURE 2 illustrates a modification of the apparatus shown in FIGURE 1 in order to treat both sides of the film 4 with corona discharge to insure permanent bonding when the upper surface is contacted with the lower surface. In this form of the invention, after the upper surface 24 of the film 4 had been treated with corona discharge from corona discharge apparatus 14, the film was passed over an identical corona discharge apparatus 28 in order to treat the lower film surface 26. In view of the fact that both upper film surface 24 and lower film surface 26 were corona discharge treated and, hence, would adhere together if they came in contact, it was necessary to insert slip sheet 30 supplied from roll 32 before the film 4 was wound on rewind roll 18. The slip sheet can be made of paper or regular polyethylene.

It is possible to simultaneously treat both sides of the film by using a sufficient intensity of corona treatment.

As shown in FIGURES 3 and 4, irradiated biaxially oriented polyethylene film 40 which has been corona discharge treated on its upper surface 42 is supplied from roll 44 and passed over support 46. Sulfanilamide pills 48 are deposited on the film from dispensers 50. A second irradiated biaxially oriented polyethylene film 52, which has been corona discharge treated on its lower surface 54, is supplied from the roll 56 and passes between guide rollers 57 and 58 before passing over pills 48. A foam rubber squeeze roller 60 is utilized to force the film layers into intimate contact in the area surrounding the pills. The roller 60 merely brings the film surfaces 42 and 54 in contact with each other and does not exert any significant pressure on the thus contacted surfaces. The film surfaces 42 and 54 were found to adhere very strongly together to form a tight package around the pills. To aid in tearing between units, perforated lines 62 can be formed transversely (as well as laterally) of the film as shown in FIGURE 5. Any conventional perforating machine can be used to make the perforations. Adjacent packages are tightly sealed in between the pills as is best seen in FIGURE 6.

In place of a single roller, a pair of foam rubber rollers can be used to force the upper and lower film layers into contact on the support 46. Also, in place of using foam rubber rollers, the pills could be packaged by passing the lower film over a traveling belt having pockets and forcing the pills into the pockets prior to applying the upper film. Alternatively, the pills could be applied between the two films with the aid of relatively hard rollers having pockets for the pills.

Obviously, the electrostatic treating apparatus of FIGURE 1 may be combined with a packaging machine such as in FIGURES 3 and 4 or other types of automatic wrapping equipment.

The procedure illustrated in FIGURES 3 to 6 is also suitable for packaging golf balls, candy or other multiple objects.

The film sealing procedure can be used in sealing individual packages utilizing hand wrappers, e.g., individual boxes of candy, frozen food, or the like, can be so wrapped using the corona discharge treated film 64 folded back on itself at 66 to form a seal around an article 68, or the film can be likewise used in high speed machine wrapping. The ability to dispense with the normal heat sealing and/or pressure sealing elements is highly advantageous.

Figure 8:
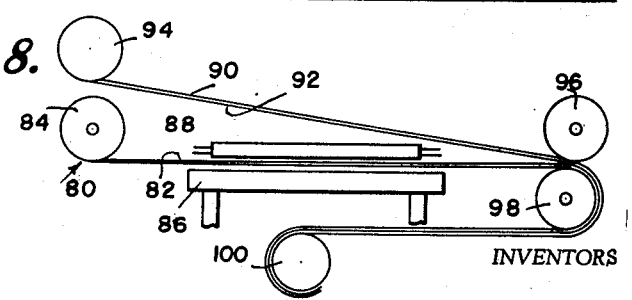
FIGURE 8 is a schematic illustration showing laminating two layers of irradiated polyethylene with printing on an inner surface.

As shown in FIGURE 8, the present invention is also useful in forming a laminae with printing therebetween.

Irradiated, biaxially oriented polyethylene film 80 (Alathon 14) irradiated to an extent of about 12 megarad and biaxially stretched 350% in each direction which had been corona discharge treated on its upper surface 82 was supplied from roll 84 and passed over support 86. Printing indicia was applied to the treated surface by printing press 88. Then a second web of irradiated biaxially oriented polyethylene film 90, which had been corona discharge treated on its lower surface 92 was supplied from roll 94. The dried printed polyethylene film was laminated to the second film 90 by passing the two webs through a set of pinch rolls 96 and 98. The joined webs were then wound into a single roll 100. It was impossible to delaminate the films. Sealing was thus accomplished without the use of adhesives or special sealing processes.

In place of utilizing printing, the contacting surface of either the upper film or lower film, or both contacting surfaces, can be given a covering of saran or other coating material and the strong, permanent laminate will be formed provided that sufficient area around the outer edges of the corona discharge treated surfaces is not coated so that there is an opportunity to form the strong bond between the two corona discharge treated surfaces.

To remove the self-sealing or tack properties from areas where it is not wanted, a thin layer of the film can be removed from such areas or the tack can be removed by the addition of various dry powders, e.g. talc, starch, baking powder, chalk, etc., by dusting therewith, or the film can be wet processed, e.g. as in shrinking by placing the package in hot water. The effect can also be destroyed by a slight amount of halogenation, e.g. treatment with chlorine gas. The application of a stiff bristle brush or of a corduroy roll to the surface also erases the effect.

In general, there is employed in the invention polyethylene film or tubing which has been irradiated to an extent of 2 to 100 megarad, preferably 6 to 20 megarad. The irradiation can be accomplished in conventional fashion, e.g. by the use of a high voltage resonant transformer, such as the 2,000,000 volt transformer, or a Van de Graaff electron generator. For example, there can be employed any of the irradiation procedures disclosed in Rainer application, Serial No. 523,316, filed July 20, 1955, now Patent 2,855,517, the entire disclosure of which is hereby incorporated by reference. Such methods include the use of electrons, gamma rays, e.g. by employing cobalt 60, etc.

The biaxial orientation is normally carried out to an extent of 100 to 700% longitudinally and 100 to 900% laterally. The biaxial stretching can be carried out by blowing irradiated polyethylene tubing as disclosed in Baird application, Serial No. 713,848, filed February 7, 1958, now Patent No. 3,022,543, February 27, 1962, or by the procedure disclosed in Rainer application, Serial No. 516,236, filed June 17, 1955, now Patent 2,877,500.

There can be employed as the starting polyethylene for the irradiation procedure high, low or medium density polyethylene prepared by low or high pressure technique. The starting polyethylene can have a molecular weight of 7,000 to 35,000 or even higher.

The electrostatic discharge apparatus can be any of the conventional corona discharge apparatus, including the Howard electrostatic treater, or the Aetna treater or Mancib treater, or apparatus of the type disclosed in British Patent 715,914 and British Patent 771,234. Preferably, the corona discharge apparatus is a transformer capable of delivering at least 10,000 volts, at 5 to 40 milliamperes A.C. and usually it delivers a voltage of 10,000 to 30,000 volts. Currents up to 360 milliamperes have been used successfully.

While the irradiated, biaxially oriented polyethylene is described as being in the form of film when it is treated with corona discharge, it will be appreciated that the film can be monolayer or bilayer. The film can be in the form of tubing.

If any treated area is exposed after sealing, the tackiness can be used to join adjacent packages for multiple sales.

What is claimed is:

1. Irradiated oriented polyethylene which has been subsequently treated on at least one surface with corona discharge to an extent sufficient to cause the surface of the irradiated oriented polyethylene to be able to adhere to itself in the absence of significant pressure and heat, said irradiation being to an extent of 2 to 100 megarad.

2. Irradiated, biaxially oriented polyethylene which has been subsequently treated on at least one surface with corona discharge to an extent sufficient to cause the surface of the irradiated, biaxially oriented polyethylene to be able to adhere to itself in the absence of significant pressure and heat, said irradiation being to an extent of 2 to 100 megarad.

3. A package comprising a first layer of an irradiated, biaxially oriented, corona discharge treated polyethylene and a second layer of an irradiated, biaxially oriented, corona discharge treated polyethylene, said corona discharge treatment of each of said layers being subsequent to the irradiation and being sufficient to cause the surfaces of the irradiated oriented polyethylene to be able to adhere to themselves in the absence of significant pressure and heat, the treated surface of said second layer being in sealing direct contact with the treated surface of said first layer, the irradiation of said first and second layers being to an extent of 2 to 100 megarad.

4. A package according to claim 3 having a plurality of articles individually sealed between said layers.

5. A method of making oriented irradiated polyethylene self-adherent, said irradiation being to an extent of from 2 to 100 megarad, comprising applying a corona discharge to said oriented polyethylene, said corona discharge being sufficient to cause the surface of the irradiated oriented polyethylene to adhere to itself without significant pressure and heat.

6. A method of making irradiated, biaxially oriented polyethylene film self-adherent, said irradiation being to an extent of between $6 \times 10^6$ and $20 \times 10^6$ megarad, comprising treating at least one side of the film with corona discharge sufficient to cause the surface of the irradiated oriented polyethylene to be able to adhere to itself in the absence of significant pressure and heat.

7. A method of forming a package comprising contacting a corona discharge treated surface of irradiated, biaxially oriented polyethylene, said irradiation being to an extent of 2 to 100 megarad with a corona discharge created surface of an irradiated oriented polyethylene film, said irradiation being to an extent of 2 to 100 megarad, said corona discharge being sufficient to cause the surface of the irradiated oriented polyethylene to be able to adhere to itself in the absence of significant pressure and heat, and thereby adhering the two polyethylene film surfaces directly to each other.

8. A method of forming a package comprising positioning at least one article between two layers of corona discharge treated irradiated, biaxially oriented polyethylene film, the said irradiation being to an extent of 2 to 100 megarad, said corona discharge being sufficient to cause the surface of the irradiated oriented polyethylene to be able to adhere to itself in the absence of significant pressure and heat and then contacting the corona discharge treated surface of the two layers without the use of heat to adhere them directly to each other.

9. A method of protecting printed indicia comprising applying the printed indicia to the surface of an irradiated, biaxially oriented, corona discharge treated polyethylene film, said corona discharge being sufficient to cause the surface of the irradiated oriented polyethylene to be able to adhere to itself in the absence of significant pressure and heat, and without the use of heat contacting said printed corona discharge treated surface directly with the surface of a second irradiated, biaxially oriented similarly corona discharge treated polyethylene film, said irradiation being to an extent of 2 to 100 megarad, to form a permanent polyethylene laminate with the printed indicia therebetween.

References Cited in the file of this patent

UNITED STATES PATENTS

| | | |
|---|---|---|
| 2,579,415 | Carson | Dec. 18, 1951 |
| 2,636,836 | Whigham | Apr. 28, 1953 |
| 2,750,319 | Sauders | June 12, 1956 |
| 2,778,739 | Rodth | Jan. 22, 1957 |
| 2,807,548 | Morrison | Sept. 24, 1957 |
| 2,810,933 | Pierce et al. | Oct. 29, 1957 |
| 2,830,943 | MacKenzie | Apr. 15, 1958 |
| 2,855,517 | Rainer et al. | Oct. 7, 1958 |
| 2,877,500 | Rainer et al. | Mar. 17, 1959 |
| 2,878,174 | Rainer et al. | Mar. 17, 1959 |
| 2,887,445 | Calfee et al. | May 19, 1959 |
| 2,923,404 | Adell | Feb. 2, 1960 |
| 2,923,964 | Plonsky | Feb. 9, 1960 |
| 2,935,418 | Berthold et al. | May 3, 1960 |
| 2,936,261 | Cole | May 10, 1960 |
| 3,018,189 | Traver | Jan. 23, 1962 |

OTHER REFERENCES

"New Irradiated Plastic Tapes," Atomics, November 1956, p. 388.